United States Patent
Tanaka

(10) Patent No.: US 10,419,632 B2
(45) Date of Patent: Sep. 17, 2019

(54) IMAGE FORMING APPARATUS WITH OCCUPATION CONTROL

(71) Applicant: KYOCERA Document Solutions Inc., Osaka-shi, Osaka (JP)

(72) Inventor: Koichi Tanaka, Osaka (JP)

(73) Assignee: KYOCERA Document Solutions Inc., Osaka-shi, Osaka (JP)

(*) Notice: Subject to any disclaimer, the term of this patent is extended or adjusted under 35 U.S.C. 154(b) by 0 days.

(21) Appl. No.: 16/046,677

(22) Filed: Jul. 26, 2018

(65) Prior Publication Data

US 2019/0037096 A1 Jan. 31, 2019

(30) Foreign Application Priority Data

Jul. 31, 2017 (JP) ................... 2017-147615

(51) Int. Cl.
*G06F 3/12* (2006.01)
*H04N 1/00* (2006.01)

(52) U.S. Cl.
CPC ..... *H04N 1/00915* (2013.01); *H04N 1/00663* (2013.01); *H04N 1/00665* (2013.01); *H04N 1/00925* (2013.01)

(58) Field of Classification Search
CPC .......... H04N 1/00915; H04N 1/00663; H04N 1/00665; H04N 1/00925; B41J 11/0025; B41J 11/50
USPC ................. 358/1.1–1.18, 402, 498
See application file for complete search history.

(56) References Cited

U.S. PATENT DOCUMENTS

| | | | | |
|---|---|---|---|---|
| 2007/0061474 A1* | 3/2007 | Quach | ................... | G06F 3/1208 709/229 |
| 2010/0290088 A1* | 11/2010 | Ito | .......................... | G03G 15/55 358/1.16 |
| 2015/0145198 A1* | 5/2015 | Sakata | ..................... | B65H 3/44 271/9.02 |
| 2015/0160902 A1* | 6/2015 | Tsujita | .................. | G06F 3/1257 358/1.6 |
| 2016/0205281 A1* | 7/2016 | Narita | ................... | G06F 3/1204 399/82 |
| 2018/0316811 A1* | 11/2018 | Taniguchi | .......... | H04N 1/00633 |

FOREIGN PATENT DOCUMENTS

JP 2011230896 A 11/2011

* cited by examiner

*Primary Examiner* — Gabriel I Garcia
(74) *Attorney, Agent, or Firm* — Alleman Hall Creasman & Tuttle LLP

(57) ABSTRACT

Upon receiving an occupation request command from an information processing apparatus, a control device performs an occupation control to set a specified supply portion as an occupied supply portion from when an occupation establishment event occurs to when an occupation release event occurs. When a multiple use request state occurs by receiving, from other information processing apparatuses, the $2^{nd}$ and onward occupation request commands that specify the occupied supply portion as specified supply portions, and after the occupation control ends, the control device executes the occupation control for each of the $2^{nd}$ and onward occupation request commands in an order in which the $2^{nd}$ and onward occupation request commands were received.

13 Claims, 8 Drawing Sheets

FIG.9

| CASSETTE NO.1 | A4 | VIRGIN PAPER | ... |
|---|---|---|---|
| CASSETTE NO.2 | A4 | RECYCLED PAPER | ... |
| CASSETTE NO.3 | B5 | VIRGIN PAPER | ... |

IMAGE FORMING APPARATUS WITH OCCUPATION CONTROL

INCORPORATION BY REFERENCE

This application is based upon and claims the benefit of priority from the corresponding Japanese Patent Application No. 2017-147615 filed on Jul. 31, 2017, the entire contents of which are incorporated herein by reference.

BACKGROUND

The present disclosure relates to an image forming apparatus that can execute a print process while occupying a sheet supply portion.

In general, an image forming apparatus includes one or more sheet supply portions in each of which sheets are set. In the image forming apparatus, there may be a case where one or more temporary-use sheets, such as sheets of color paper or thick paper, are temporarily set in any of the sheet supply portions, and the print process is executed on the temporary-use sheets. The temporary-use sheets are different in type from the sheets originally set in the sheet supply portions.

In addition, it is known that when an authenticated user selects one out of the one or more sheet supply portions, the image forming apparatus prohibits the other users from using the sheet supply portion selected by the authenticated user.

SUMMARY

An image forming apparatus according to an aspect of the present disclosure includes a print processing device, one or more sheet supply portions, a communication device, and a control device. The print processing device executes a print process to form an image on a sheet. Sheets to be supplied to the print processing device are set in the one or more sheet supply portions. The communication device performs communication with a plurality of information processing apparatuses. The control device, upon receiving print data from one of the plurality of information processing apparatuses via the communication device, causes the print processing device to execute the print process based on the print data. Upon receiving, from one of the plurality of information processing apparatuses via the communication device, an occupation request command that specifies one of the one or more sheet supply portions as a specified supply portion, the control device performs an occupation control to set the specified supply portion as an occupied supply portion from when a predetermined occupation establishment event occurs to when a predetermined occupation release event occurs. The control device, during the occupation control, permits the occupied supply portion to be used in a print process that is executed based on print data received from a transmission source of the occupation request command, and prohibits the other print processes from using the occupied supply portion. When a multiple use request state occurs by receiving, from one or more other information processing apparatuses among the plurality of information processing apparatuses, the $2^{nd}$ and onward occupation request commands that specify the occupied supply portion as specified supply portions, and after the occupation control ends, the control device executes the occupation control including a predetermined notification process for each of the $2^{nd}$ and onward occupation request commands in an order in which the $2^{nd}$ and onward occupation request commands were received.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 9 is a diagram showing an example of a configuration of sheet size registration data.

DETAILED DESCRIPTION

The following describes embodiments of the present disclosure with reference to the accompanying drawings. It should be noted that the following embodiments are examples of specific embodiments of the present disclosure and should not limit the technical scope of the present disclosure.

[First Embodiment: Configuration of Image Forming Apparatus 10]

Figure 1:
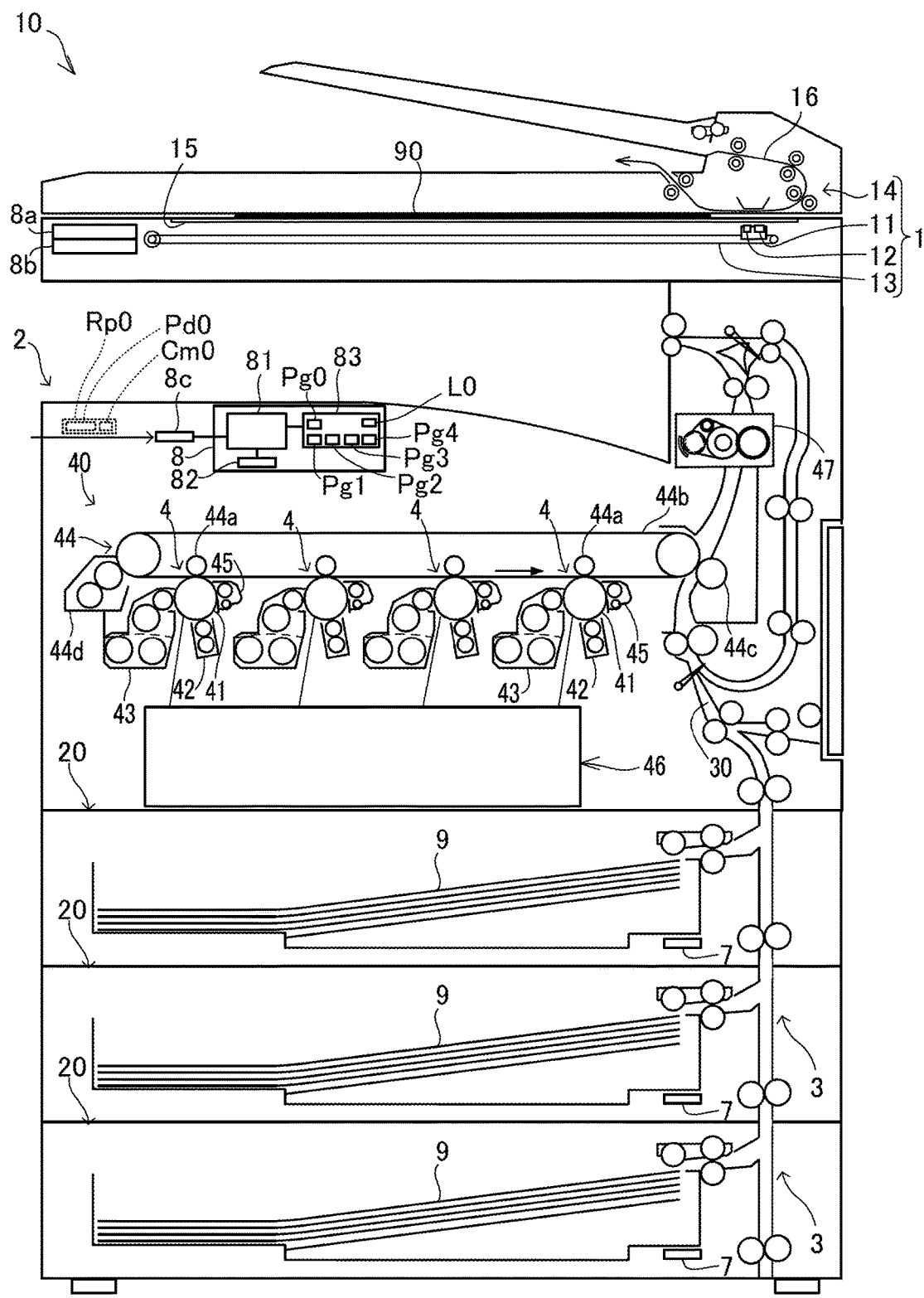
FIG. 1 is a configuration diagram of an image forming apparatus according to a first embodiment.

An image forming apparatus 10 according to a first embodiment is configured to execute a print process to form an image on a sheet 9 (see FIG. 1). For example, the image forming apparatus 10 is a printer, a copier, or a multifunction peripheral having a copy function and a facsimile communication function.

With the configuration shown in FIG. 1, the image forming apparatus 10 can also execute an image reading process and a copy process, wherein in the image reading process, an image is read from a document sheet 90, and in the copy process, both the image reading process and the print process are executed.

As shown in FIG. 1, the image forming apparatus 10 includes an image reading device 1, a main device 2, an operation device 8a, a display device 8b, and a communication device 8c.

The image reading device 1 is configured to execute the image reading process. The image reading device 1 includes a light souce 11, an image sensor 12, a first scanning mechanism 13, and a second scanning mechanism 14.

The light souce 11 emits light toward the document sheet 90. The first scanning mechanism 13 scans the light from the light souce 11 on the document sheet 90 placed on a document sheet table 15, by moving the light souce 11 along the document sheet table 15.

The second scanning mechanism 14 is a so-called ADF (Auto Document Feeder). The second scanning mechanism 14 scans the light emitted from the light souce 11 toward a predetermined reading position, on the document sheet 90 by feeding the document sheet 90 along a document sheet feeding path 16 that includes the reading position.

The image sensor 12 receives reflected light from the document sheet 90, detects a light amount of the reflected light, and outputs data of the detected light amount as image data.

The main device 2 includes a plurality of sheet cassettes 20, a sheet conveyance mechanism 3, a print processing device 40, and a control device 8, wherein sheets 9 are set in each of the plurality of sheet cassettes 20. In the example shown in FIG. 1, the image forming portion 40 executes the print process by an electrophotographic system.

The plurality of sheet cassettes 20 are an example of a plurality of sheet supply portions in which sheets 9 to be supplied to the print processing device 40 are set. It is noted that the plurality of sheet supply portions may include a manual feed tray.

The plurality of sheet cassettes 20 are attached to a main body of the image forming apparatus 10 in a drawable manner. The image forming apparatus 10 includes a plurality of drawer sensors 7 respectively for the plurality of sheet cassettes 20, wherein each drawer sensor 7 detects whether or not a drawing operation of drawing a corresponding sheet cassette 20 from the main body has been performed.

For example, the drawer sensor 7 may be a photo sensor or a limit switch which is configured to detect whether a corresponding sheet cassette 20 is in a state of being attached to the main body and a state of having been drawn out from the main body.

The print processing device 40 is a tandem type for executing a color print process. The print processing device 40 includes a plurality of image creating devices 4, a laser scanning unit 46, a transfer device 44, and a fixing device 47.

The sheet conveyance mechanism 3 feeds a sheet 9 from any of the plurality of sheet cassettes 20 to the sheet conveyance path 30 and conveys the sheet 9 along the sheet conveyance path 30.

The plurality of image creating devices 4 respectively include drum-like photoconductors 41 and form toner images of different colors on the surfaces of the photoconductors 41. Each of the image creating devices 4 includes, in addition to the photoconductor 41, a charging device 42, a developing device 43, and a drum cleaning device 45.

The charging device 42 charges the surface of the photoconductor 41. The laser scanning unit 46 writes an electrostatic latent image on a charged surface of the photoconductor 41. The developing device 43 develops the electrostatic latent image on the photoconductor 41 into a toner image.

The transfer device 44 transfers toner images from surfaces of the photoconductors 41 to the sheet 9 that is being conveyed along the sheet conveyance path 30. In the transfer device 44, four primary transfer devices 44a transfer the toner images from the surfaces of the four photoconductors 41 to a surface of an intermediate transfer belt 44b that is moving in a rotational movement, thereby forming a color toner image from the toner images of four different colors. Furthermore, a secondary transfer device 44c transfers the color toner image from the intermediate transfer belt 44b to the sheet 9.

The drum cleaning device 45 removes residual toner from the photoconductor 41. In addition, in the transfer device 44, a belt cleaning device 44d removes residual toner from the intermediate transfer belt 44b.

The fixing device 47 fixes the color toner image transferred to the sheet 9, to the sheet 9 by heating the color toner image.

As describe above, the main device 2 executes the print process in which a sheet 9 is fed from any of the plurality of sheet cassettes 20, and an image is formed on the sheet 9.

It is noted that the print processing device 40 may execute the print process by a system, such as an inkjet system, other than the electrophotographic system.

The operation device 8a is configured to detect an information input operation performed by the user thereon, and includes, for example, a touch panel. The display device 8b includes a display panel, such as a liquid crystal panel, that can display information.

The communication device 8c is a communication interface device configured to perform communication with terminal apparatuses (not shown) via a network such as LAN (Local Area Network). The terminal apparatuses are each an information processing apparatus such as a personal computer or a smartphone. The control device 8 performs data transmissions/receptions to/from the terminal apparatus all via the communication device 8c.

The control device 8 includes a CPU (Central Processing Unit) 81, a primary storage device 82, and a secondary storage device 83. The CPU 81 executes various calculations, data processing, and control of the electric equipment provided in the image forming apparatus 10, by executing programs having been stored in the secondary storage device 83 or the like in advance.

The CPU 81 is configured to transfer data and control signals among the image reading device 1, the print processing device 40, the operation device 8a, the display device 8b, and the communication device 8c.

For example, upon input of a reading start operation to the operation device 8a, the CPU 81 causes the image reading device 1 to perform the image reading process according to the reading start operation. Furthermore, upon input of a copy start operation to the operation device 8a, the CPU 81 causes the image reading device 1 to execute the image reading process and causes the print processing device 40 to execute the print process based on image data obtained by the image reading process.

In addition, the CPU 81 receives print data Pd0 from a terminal apparatus via the communication device 8c, and causes the print processing device 40 to execute the print process based on the received print data Pd0. The CPU 81 causes either or both of the image reading device 1 and the print processing device 40 to execute the image reading process, the print process, or the copy process, by executing a main control program Pg0. The main control program Pg0 is stored in the secondary storage device 83 (see FIG. 1).

It is noted that a processor, such as a DSP (Digital Signal Processor), other than the CPU 81 may execute the control concerning the print process and the image reading process instead of the CPU 81.

The primary storage device 82 temporarily stores the programs executed by the CPU 81 and data that is output and referenced during the process in which the programs are executed by the CPU 81. The primary storage device 82 is, for example, a RAM (Random Access Memory).

The secondary storage device 83 is a nonvolatile, computer-readable storage device configured to store programs or data referenced by the CPU 81. For example, the secondary storage device 83 may be a flash memory or a hard disk drive.

In the image forming apparatus 10, one or more temporary-use sheets, such as sheets of color paper or thick paper, may be temporarily set in any of the plurality of sheet cassettes 20, and the print process may be executed on the temporary-use sheets. The temporary-use sheets are special sheets that are different in type from the sheets 9 originally set in the sheet cassettes 20.

There is known a conventional apparatus that, when an authenticated user selects one out of one or more sheet cassettes 20, prohibits the other users from using the sheet cassette 20 selected by the authenticated user.

Meanwhile, there may be a case where while a first user is occupying a specific sheet cassette 20, a second user attempts to occupy the specific sheet cassette 20, and then after the occupation of the specific sheet cassette 20 by the first user is released, a third user occupies the specific sheet cassette 20 before the second user performs an operation to occupy the specific sheet cassette 20. This is an unfair case.

In the image forming apparatus 10, the CPU 81 of the control device 8 executes a request acceptance process and an occupation control that are described below. With this configuration, when a plurality of users desire to occupy a same sheet cassette 20, the image forming apparatus 10 controls the occupation setting of the desired sheet cassette 20 so that the desired sheet cassette 20 can be fairly occupied by the plurality of users in sequence.

As described below, in the image forming apparatus 10, one of the plurality of sheet cassettes 20 may be set as an occupied cassette. Here, "occupied print" refers to a print process executed by the image forming apparatus 10 by using a sheet 9 supplied from the occupied cassette, based on the print data Pd0 received from a specific terminal apparatus. It is noted that the occupied cassette is an example of the occupied sheet supply portion.

When the user desires to cause the image forming apparatus 10 to execute the occupied print using the temporary-use sheet, first the user performs a cassette occupation operation on the terminal apparatus of the user's own seat. The cassette occupation operation includes an operation to specify one of the sheet cassettes 20 as a specified cassette, and an operation to specify a piece of print data Pd0.

When the cassette occupation operation is performed, the terminal apparatus transmits an occupied print request Rp0 to the image forming apparatus 10, wherein the occupied print request Rp0 includes an occupation request command Cm0 and the print data Pd0, the occupation request command Cm0 including information of the specified cassette.

In the request acceptance process, the CPU 81 of the image forming apparatus 10 accepts the occupied print request Rp0. The CPU 81 also performs the occupation control. The occupation control is a process in which the CPU 81 sets, as the occupied cassette, the specified cassette specified in the occupation request command Cm0, during a time period in which a predetermined condition is satisfied.

After setting the occupied cassette, the CPU 81 permits the occupied cassette to be used in the occupied print that is performed based on the print data Pd0 received from the transmission source of the occupation request command Cm0, and prohibits the other print processes from using the occupied cassette.

[Request Acceptance Process]

Figure 2:
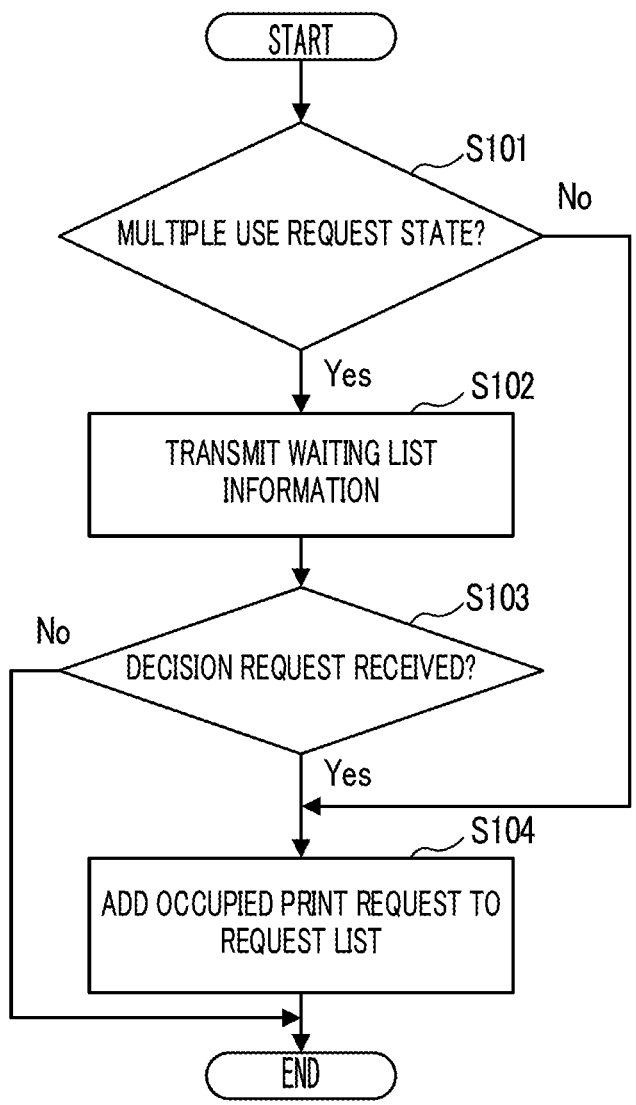
FIG. 2 is a flowchart showing an example of a procedure of a request acceptance process in the image forming apparatus according to the first embodiment.

The following describes an example of the procedure of the request acceptance process with reference to the flowchart shown in FIG. 2. The CPU 81 realizes the request acceptance process by executing a request acceptance program Pg1 that has been stored in the secondary storage device 83 in advance.

Upon receiving the occupied print request Rp0 including the occupation request command Cm0, the CPU 81 starts executing the request acceptance process. In the following description, S101, S102, . . . are identification signs representing a plurality of steps of the request acceptance process.

<Step S101>

In the request acceptance process, the CPU 81 determines whether or not a multiple use request state has occurred. The multiple use request state is a state where the occupied cassette has already been set for a terminal apparatus, and the $2^{nd}$ and onward occupation request commands Cm0 that specify the occupied cassette as the specified cassette, have been received from other terminal apparatuses.

Upon determining that the multiple use request state has occurred, the CPU 81 moves the process to step S102. Otherwise, the CPU 81 moves the process to step S104.

In the following description, an order in which the image forming apparatus 10 in the multiple use request state receives the occupation request command Cm0 from a plurality of terminal apparatuses is referred to as an acceptance order.

<Step S102>

In step S102, the CPU 81 transmits waiting list information to each transmission source of each newly received occupation request command Cm0. The waiting list information is set based on the states of other previously received occupation request commands Cm0.

The waiting list information is transmitted to transmission sources of the $2^{nd}$ and onward occupation request commands Cm0. After the completion of step S102, the CPU 81 moves the process to step S103.

For example, the waiting list information may include the acceptance order, the number of prints of the print processes, an assumed wait time, or any combination of these, wherein the number of prints of the print processes is obtained from the print data Pd0 corresponding to the previously received occupation request commands Cm0, and the assumed wait time is derived from the number of prints.

In the present embodiment, by transmitting the waiting list information, the CPU 81 asks whether it is alright for the transmission source of the occupation request command Cm0 that the CPU 81 decides to accept the occupation request command Cm0 that will cause the multiple use request state to occur.

<Step S103>

In step S103, the CPU 81, for a predetermined time period, monitors whether or not a decision request requesting the CPU 81 to decide to accept the occupation request command Cm0, is received from the transmission destination of the waiting list information. Upon finding that the decision request has been received, the CPU 81 moves the process to step S104. Otherwise, the CPU 81 skips step S104 and ends the request acceptance process.

<Step S104>

In step S104, the CPU 81 adds a newly received occupied print request Rp0 to a request list L0 as the last element thereof, and stores the request list L0 to which the newly received occupied print request Rp0 has been added, in the secondary storage device 83. Thereafter, the CPU 81 ends the request acceptance process.

The request list L0 is a list of occupied print requests Rp0 that are waiting to be processed, wherein the request list L0 is set for each of the sheet cassettes 20. The CPU 81 adds the newly received occupied print request Rp0 to a request list L0 that corresponds to a specified cassette specified by an occupation request command Cm0 included in the newly received occupied print request Rp0.

The CPU 81 sets, as a target of an occupation control that is described below, one or more occupied print requests Rp0 included in the request list L0, in sequence from the one at the head of the list. It is noted that the secondary storage device 83 that stores the request list L0 of the occupied print requests Rp0 is an example of the first storage device.

As described above, when the multiple use request state has occurred, the CPU 81 transmits the waiting list information that is set based on the states of the previously received occupation request commands Cm0, to the transmission sources of the $2^{nd}$ and onward occupation request commands Cm0 (S102).

The waiting list information transmitted in this way helps the user determine whether or not to continue or abandon the request for the occupied print.

It is noted that in the present embodiment, the acceptance of the occupation request command Cm0 is decided in step S104. As a result, the occupation request command Cm0 received from the terminal apparatus immediately before step S102 is referred to as a preliminary inquiry in a sense that it asks the image forming apparatus 10 whether or not, or how, the occupation request command Cm0 will cause the multiple use request state to occur. Accordingly, when the CPU 81 receives the preliminary inquiry, the CPU 81 transmits the waiting list information to the transmission sources of the $2^{nd}$ and onward preliminary inquiries (S102).

[Occupation Control]

Figure 3:
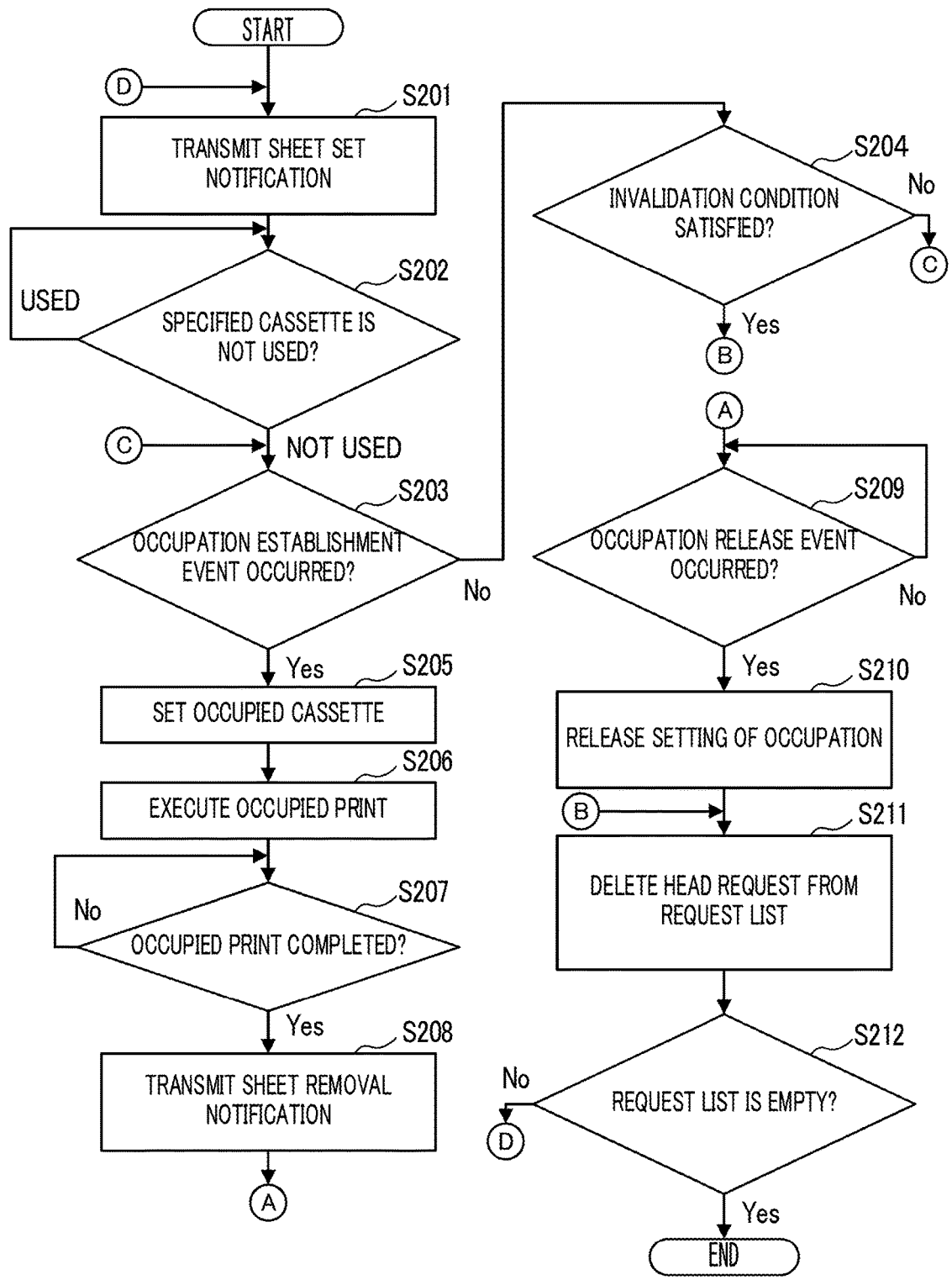
FIG. 3 is a flowchart showing an example of a procedure of an occupation control in the image forming apparatus according to the first embodiment.

Next, a description is given of an example of the procedure of the occupation control with reference to the flowchart shown in FIG. 3. The CPU 81 realizes the occupation control by executing an occupation control program Pg2 that has been stored in the secondary storage device 83 in advance.

The CPU 81 performs the occupation control when the request list L0 including one or more occupied print requests Rp0 is stored in the secondary storage device 83. The CPU 81 performs the occupation control with regard to the occupied print request Rp0 at the head of the request list L0, for each of the sheet cassettes 20.

As described below, the occupied print request Rp0 at the head of the request list L0 is deleted when the occupation control ends. As a result, the CPU 81 performs the occupation control on each of the occupied print requests Rp0 in the request list L0 in accordance with an arrangement order of the occupied print requests Rp0. In the following description, S201, S202, . . . are identification signs representing a plurality of steps of the occupation control. In addition, the occupied print request Rp0 at the head of the request list L0 is referred to as a head request.

<Step S201>

In the occupation control, the CPU 81 transmits a predetermined sheet set notification to the transmission source of the head request. The sheet set notification urges to set a temporary-use sheet in a specified cassette specified in the occupation request command Cm0 that is included in the head request.

<Step S202>

Furthermore, if the specified cassette is being used by a preceding print process at the time of receiving a new occupied print request Rp0, the CPU 81 waits for the preceding print process to end.

For example, after the specified cassette becomes unused, the CPU 81 displays, on the display device 8b, a message that urges to set the temporary-use sheet in the specified cassette. When it is determined in step S202 that the specified cassette is in unused state, the CPU 81 moves the process to step S203.

<Step S203>

In step S203, the CPU 81 monitors whether or not a predetermined occupation establishment event has occurred. Upon determining that the occupation establishment event has occurred, the CPU 81 moves the process to step S205. Otherwise, the CPU 81 moves the process to step S204.

In the present embodiment, the occupation establishment event is a detection of a predetermined occupation establishment operation performed on the image forming apparatus 10. The occupation establishment operation includes a drawing operation of drawing the specified cassette, and an occupation request specification operation performed on the operation device 8a.

The drawing operation is detected by the drawer sensor 7. The occupation request specification operation is performed to specify the head request stored in the secondary storage device 83. The CPU 81 displays, on the display device 8b, information of the terminal apparatus that has transmitted the head request, and then determines whether or not the occupation request specification operation has been performed on the operation device 8a.

In the present embodiment, the occupation establishment operation includes the drawing operation of drawing the specified cassette. This prevents the occupied print from starting without setting the temporary-use sheet in the specified cassette.

In addition, the occupation establishment operation includes the occupation request specification operation. This prevents a user other than the user who transmitted the head request, from starting the occupied print based on the print data Pd0 of the other user.

Upon detecting both the drawing operation of drawing the specified cassette and the occupation request specification operation performed on the operation device 8a, the CPU 81 determines that the occupation establishment event has occurred.

<Step S204>

In step S204, the CPU 81 determines whether or not the head request satisfies a predetermined invalidation condition, by executing an invalidation determination process that is described below while monitoring an occurrence of the occupation establishment event.

Upon determining that the head request satisfies the invalidation condition, the CPU 81 moves the process to step S211. Otherwise, the CPU 81 returns the process to step S203.

<Step S205>

Upon determining that the occupation establishment event has occurred, the CPU 81 sets the specified cassette corresponding to the head request as the occupied cassette, and moves the process to step S206. As described above, among print processes that are to use the occupied cassette, the CPU 81 permits an occupied print corresponding to the transmission source of the head request to use the occupied cassette, and prohibits the other print processes from using the occupied cassette.

<Step S206, S207>

The CPU 81 causes the print processing device 40 to execute the occupied print based on the print data Pd0 included in the head request (S206). This allows the print processing device 40 to execute the print process corresponding to the head request stored in the secondary storage device 83.

That is, the CPU 81 causes the print processing device 40 to execute the print process corresponding to the head request stored in the secondary storage device 83, when it is detected that the occupation establishment event corresponding to the head request has occurred, not when the head request is received.

The CPU 81 waits until the occupied print is completed (S207). Subsequently, the CPU 81 moves the process to step S208.

<Step S208>

After the occupied print is completed, the CPU 81 transmits a predetermined sheet removal notification to the transmission source of the head request, and displays the sheet removal notification on the display device 8b.

The sheet removal notification urges to remove the remaining temporary-use sheets from the specified cassette. After completion of the process of step S208, the CPU 81 moves the process to step S209.

<Step S209>

In step S209, the CPU 81 waits for a predetermined occupation release event to occur, and upon occurrence of the occupation release event, moves the process to step S210.

In the present embodiment, the occupation release event is a detection of a predetermined occupation release operation performed on the image forming apparatus 10. The occupation release operation includes the drawing operation of drawing the occupied cassette.

Upon detecting the drawing operation of drawing the occupied cassette after completion of the print process having been executed based on the print data Pd0 included in the head request, the CPU 81 determines that the occupation establishment event has occurred.

The occupation release operation may include the drawing operation and a predetermined release confirmation operation performed on the operation device 8a.

<Step S210>

Upon determining that the occupation release event has occurred, the CPU 81 releases the setting of the occupied cassette, and moves the process to step S211. A sheet cassette 20 released from the setting of the occupied cassette can be used in a print process based on the print data Pd0 received from a terminal apparatus other than the transmission source of the head request.

In the present embodiment, the occupation release event is a detection of the occupation release operation performed on the image forming apparatus 10. This prevents the setting of the occupation control from being released while forgetting to remove the temporary-use sheet from the specified cassette.

In particular, in a case where the occupation release operation includes the drawing operation of drawing the occupied cassette, it is possible to prevent, in a more reliable manner, the setting of the occupation control from being released while forgetting to remove the temporary-use sheet from the occupied cassette.

<Step S211>

Subsequently, the CPU 81 deletes the head request corresponding to the occupation release event that occurred, from the request list L0 stored in the secondary storage device 83, and moves the process to step S212.

Upon determining in step S204 that the head request satisfies the invalidation condition, the CPU 81 deletes the head request from the request list L0 without setting the specified cassette that corresponds to the head request, to the occupied cassette.

<Step S212>

When there is no occupied print request in the request list L0 after step S211, the CPU 81 ends the occupation control corresponding to the request list L0. Otherwise, the CPU 81 repeats the processes from step S201 on a new head request in the request list L0 after step S211.

As described above, the CPU 81 performs the occupation control when it receives, via the communication device 8c, the occupation request command Cm0 that specifies one of the sheet cassettes 20 as the specified cassette, from one or more terminal apparatuses (S201-S212).

The occupation control includes a process in which the specified cassette is set as the occupied cassette from when an occupation establishment event occurs to when a predetermined occupation release event occurs (S203-S210).

Furthermore, the CPU 81 adds a newly received occupied print request Rp0 to the request list L0 as the last element (S104). This means that when the multiple use request state has occurred, the CPU 81 waits for the preceding occupation control to end.

Furthermore, after the preceding occupation control ends, the CPU 81 performs the occupation control for each of the $2^{nd}$ and onward occupation request commands Cm0 in an order in which the occupation request commands Cm0 were received, wherein the occupation control includes the process of transmitting the sheet set notification to the transmission source of the occupation request command Cm0.

It is noted that the process of transmitting the sheet set notification (S201) is an example of the predetermined notification process.

With the above-described configuration, in a case where a plurality of users desire to occupy a same sheet cassette 20, the image forming apparatus 10 can set the users to occupy the sheet cassettes 20 in order fairly.

In the image forming apparatus 10, the CPU 81 may set the specified cassette to the occupied cassette in response to a reception of the occupied print request Rp0 from the terminal apparatus at the user's own seat. In that case, a reception of the occupation request command Cm0 means an occurrence of the occupation establishment event.

However, in the case where a reception of the occupation request command Cm0 means an occurrence of the occupation establishment event, the specified cassette is wastefully occupied by the user while the user moves from the user's own seat to the image forming apparatus 10 to set the temporary-use sheet to the specified cassette.

On the other hand, in the present embodiment, a detection of the occupation establishment operation performed on the image forming apparatus 10 means an occurrence of the occupation establishment event. That is, in the present embodiment, a priority in occupying the specified cassette is determined when the occupied print request Rp0 is transmitted. In addition, the CPU 81 permits a normal print process other than the occupied print using the specified cassette until the user sets the temporary-use sheet to the specified cassette. This prevents the specified cassette from being occupied wastefully.

[Invalidation Determination Process]

Figure 4:
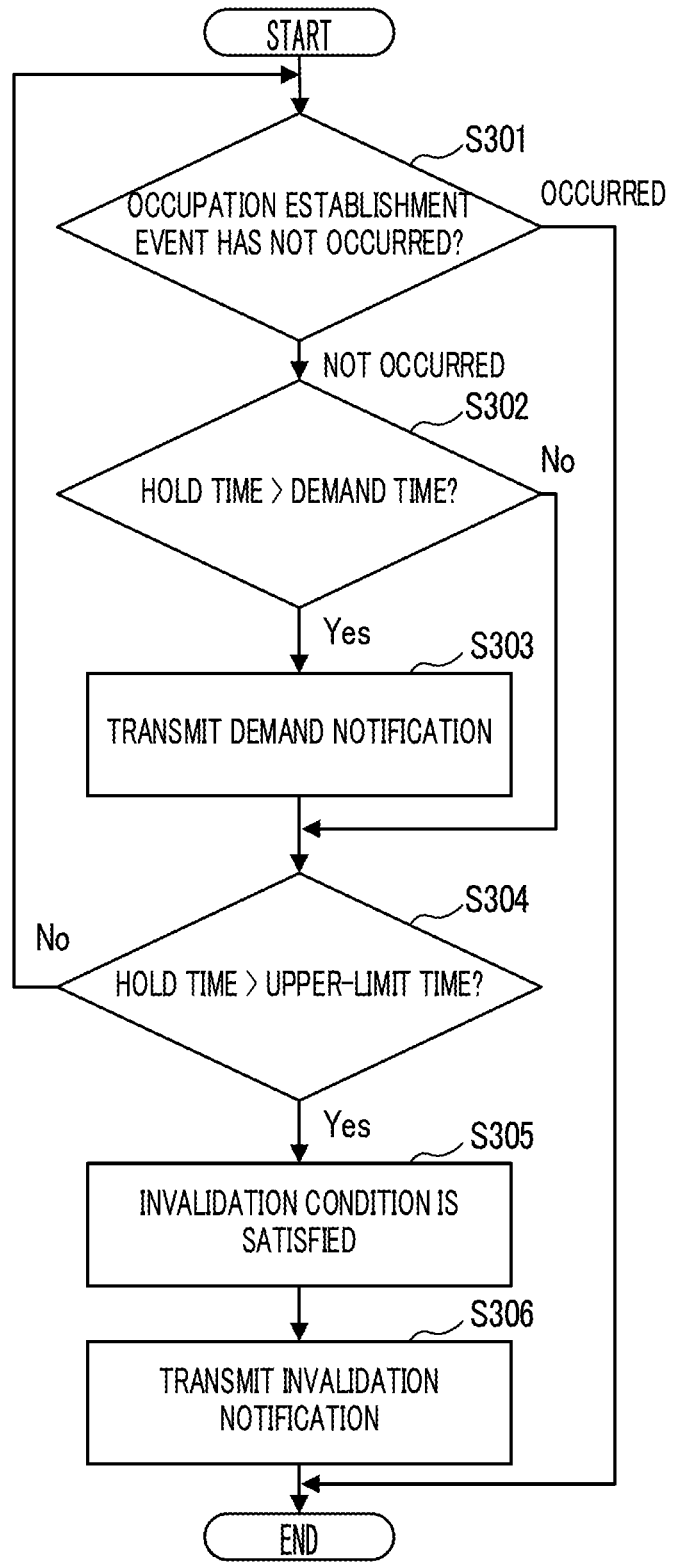
FIG. 4 is a flowchart showing an example of a procedure of an invalidation determination process in the image forming apparatus according to the first embodiment.

Next, a description is given of an example of the procedure of the invalidation determination process with reference to the flowchart shown in FIG. 4. As described above, the CPU 81 executes the invalidation determination process while monitoring an occurrence of the occupation establishment event. The CPU 81 realizes the invalidation determination process by executing an invalidation determination program Pg3 that has been stored in the secondary storage device 83 in advance.

In the following description, S301, S302, . . . are identification signs representing a plurality of steps of the invalidation determination process.

<Step S301>

In the invalidation determination process, the CPU 81 monitors whether or not an occupation establishment event corresponding to the head element has occurred. Upon determining that the occupation establishment event has occurred, the CPU 81 ends the invalidation determination process. Otherwise, the CPU 81 executes processes of step S302 and onward.

<Step S302>

Upon determining that the occupation establishment event has not occurred, the CPU 81 determines whether or not a hold time has exceeded a predetermined demand time. The hold time is a time that has elapsed since the specified cassette became unused. Upon determining that the hold time has exceeded the demand time, the CPU 81 moves the process to step S303. Otherwise, the CPU 81 skips the process of step S303, and moves the process to step S304.

<Step S303>

In step S303, the CPU 81 transmits a demand notification that urges to set the temporary-use sheet to the specified cassette, to the transmission source of the head request. Subsequently, the CPU 81 moves the process to step S304.

For example, the demand notification may include a warning that the request for the occupied print will be invalidated if performance of the occupation establishment operation is delayed.

<Step S304>

In step S304, the CPU 81 determines whether or not the hold time has exceeded a predetermined upper-limit time. The upper-limit time is longer than the demand time. Upon determining that the hold time has exceeded the upper-limit time, the CPU 81 moves the process to step S305. Otherwise, the CPU 81 repeats the processes from step S301.

<Step S305>

In step S305, the CPU 81 determines that the invalidation condition is satisfied, and moves the process to step S306. That is, the invalidation condition includes a condition that the predetermined upper-limit time has elapsed at least before the occupation establishment event occurs after a reception of the occupation request command Cm0.

<Step S306>

In step S306, the CPU 81 transmits an invalidation notification to the transmission source of the head request, and ends the invalidation determination process. The invalidation notification indicates that the request for the occupied print has been invalidated due to an excessive delay of performance of the occupation establishment operation.

As described above, the CPU 81 deletes the head request that satisfies the invalidation condition, from the request list L0 without setting the specified cassette that corresponds to the head request, to the occupied cassette (S211). This means invalidation of the occupation request command Cm0 corresponding to the head request that satisfies the invalidation condition.

With the execution of the above-described process related to the invalidation determination process, a user's occupied print is prevented from being delayed due to a delay of another user's occupation establishment operation.

[Second Embodiment]

Figure 5:
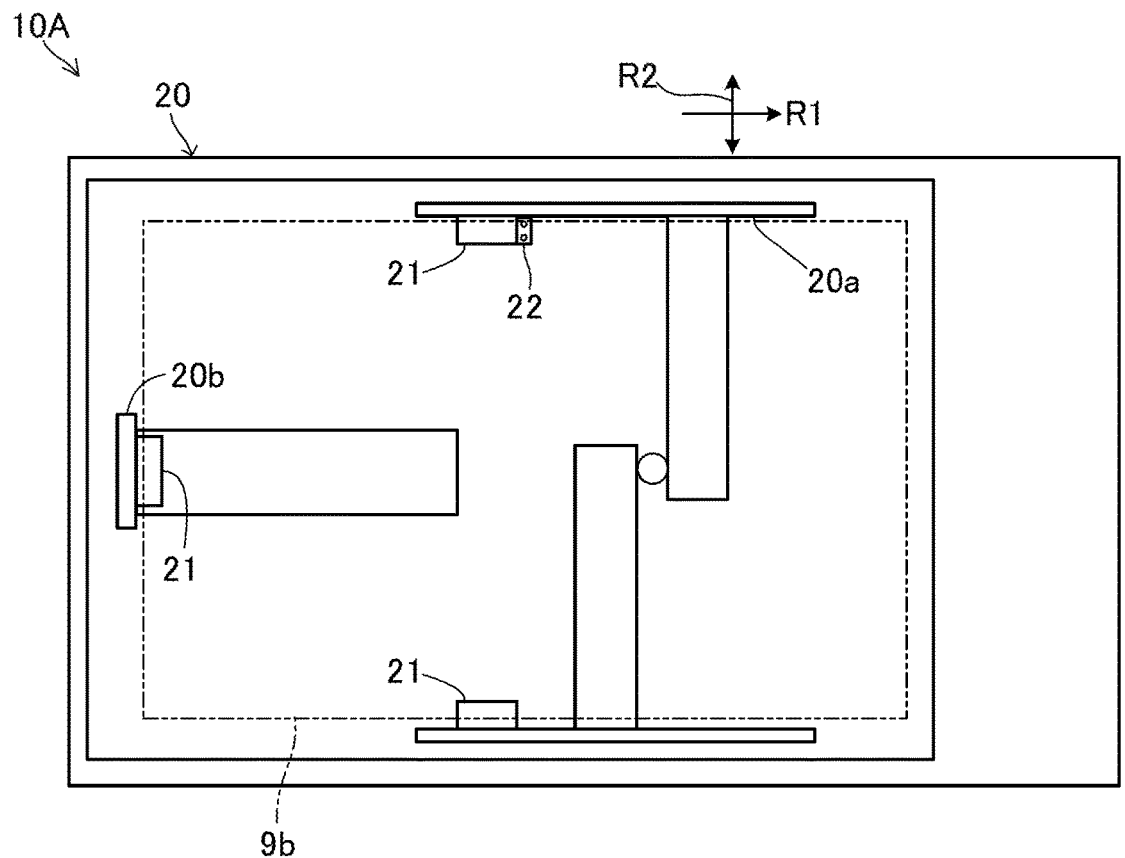
FIG. 5 is a first configuration diagram of a sheet cassette in an image forming apparatus according to a second embodiment.
Figure 6:
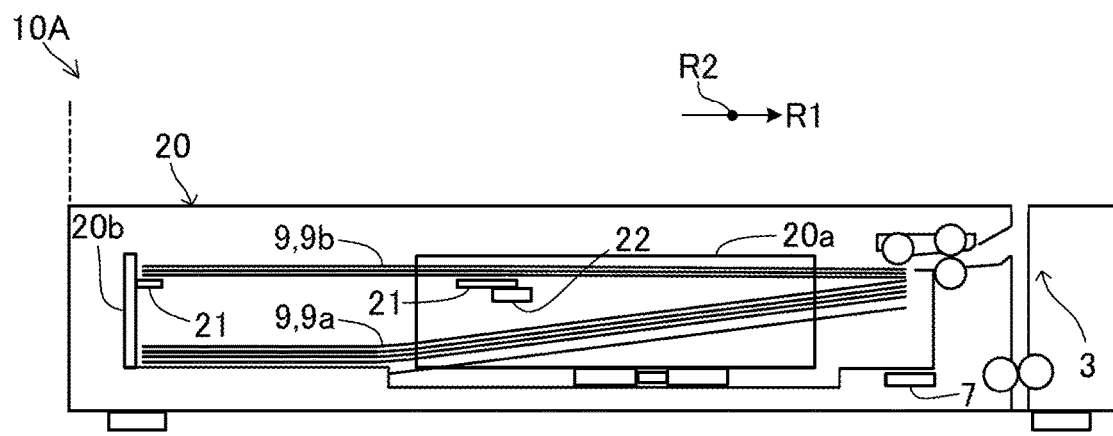
FIG. 6 is a second configuration diagram of the sheet cassette in the image forming apparatus according to the second embodiment.

Next, a description is given of an image forming apparatus 10A according to a second embodiment with reference to FIG. 5 and FIG. 6. In FIG. 5 and FIG. 6, components that are the same as those shown in FIG. 1 are assigned the same reference signs. In the following description, differences of the image forming apparatus 10A from the image forming apparatus 10 are described.

In the image forming apparatus 10A, an auxiliary support portion 21 and an auxiliary sheet sensor 22 have been added to each of the plurality of sheet cassettes 20 in the image forming apparatus 10.

The auxiliary support portion 21 is configured such that a temporary-use sheet 9b can be placed thereon so as to be distinguished from main sheets 9a that are the sheets 9 that have been set in the sheet cassette 20 in advance. It is noted that the temporary-use sheet 9b corresponds to the auxiliary sheet.

In the following description, a direction in which the sheet 9 is fed from the sheet cassette 20 is referred to as a feed direction R1, and a horizontal direction perpendicular to the feed direction R1 is referred to as a width direction R2.

Each of the sheet cassettes 20 includes a pair of side plates 20a and a rear end plate 20b, wherein the pair of side plates 20a are configured to guide, along the feed direction R1, a pair of sides of the sheet 9 that are opposite to each other in the width direction R2, and the rear end plate 20b faces a rear end of the sheet 9 that is on the upstream side in the feed direction R1.

The pair of side plates 20a are supported in such a way as to be displaced along the width direction R2 to be fitted to the size of the sheet 9 in the width direction R2. The rear end plate 20b is supported in such a way as to be displaced along the feed direction R1 to be fitted to the size of the sheet 9 in the feed direction R1.

In the present embodiment, the auxiliary support portion 21 is composed of a plurality of projection pieces that are formed to project along the horizontal direction from the pair of side plates 20a and the rear end plate 20b. The temporary-use sheet 9b is placed on the auxiliary support portion 21.

The auxiliary support portion 21 may be fixed in a state where the auxiliary support portion 21 projects from the pair of side plates 20a and the rear end plate 20b. In this case, the main sheets are set in the sheet cassette 20 below the auxiliary support portion 21 from the downstream side to the upstream side in the feed direction R1.

In addition, the auxiliary support portion 21 may be attached to the pair of side plates 20a and the rear end plate 20b such that the auxiliary support portion 21 can change from a state of projecting from the pair of side plates 20a and the rear end plate 20b to a state of being folded to be extended along the surfaces of the pair of side plates 20a and the rear end plate 20b.

The auxiliary sheet sensor 22 is configured to detect the presence or absence of the temporary-use sheet 9b on the auxiliary support portion 21. For example, the auxiliary sheet sensor 22 may be a reflection-type photosensor that detects light reflected on the temporary-use sheet 9b on the auxiliary support portion 21, or a limit switch in which the detection state changes depending on the weight of the temporary-use sheet 9b.

In the present embodiment, the occupation establishment event includes a detection of the temporary-use sheet 9b in the specified cassette by the auxiliary sheet sensor 22. For example, the detection of the temporary-use sheet 9b by the auxiliary sheet sensor 22 may be adopted as a requirement of the occupation establishment event instead of the detection of the sheet drawing operation.

Furthermore, in the present embodiment, the occupation release event includes that the temporary-use sheet 9b has not been detected in the occupied cassette by the auxiliary sheet sensor 22. For example, that the temporary-use sheet 9b has not been detected in the occupied cassette by the auxiliary sheet sensor 22, may be adopted as a requirement of the occupation release event instead of the detection of the occupation release operation.

For example, the CPU 81 may automatically release the setting of the occupied cassette when the temporary-use sheet 9b of the occupied cassette becomes undetectable by the auxiliary sheet sensor 22.

According to the present embodiment, it is possible to eliminate the trouble of removing the temporary-use sheet 9b from the occupied cassette when the user sets a necessary number of temporary-use sheets 9b in the occupied cassette.

In addition, the CPU 81 may suspend the occupied print when the auxiliary sheet sensor 22 of the occupied cassette becomes undetectable of the temporary-use sheet 9b in the middle of the occupied print. In this case, the CPU 81 may output a notification to one or both of the transmission source of the head request and the control device 8b, the notification urging to add temporary-use sheets 9b.

[Third Embodiment]

Figure 7:
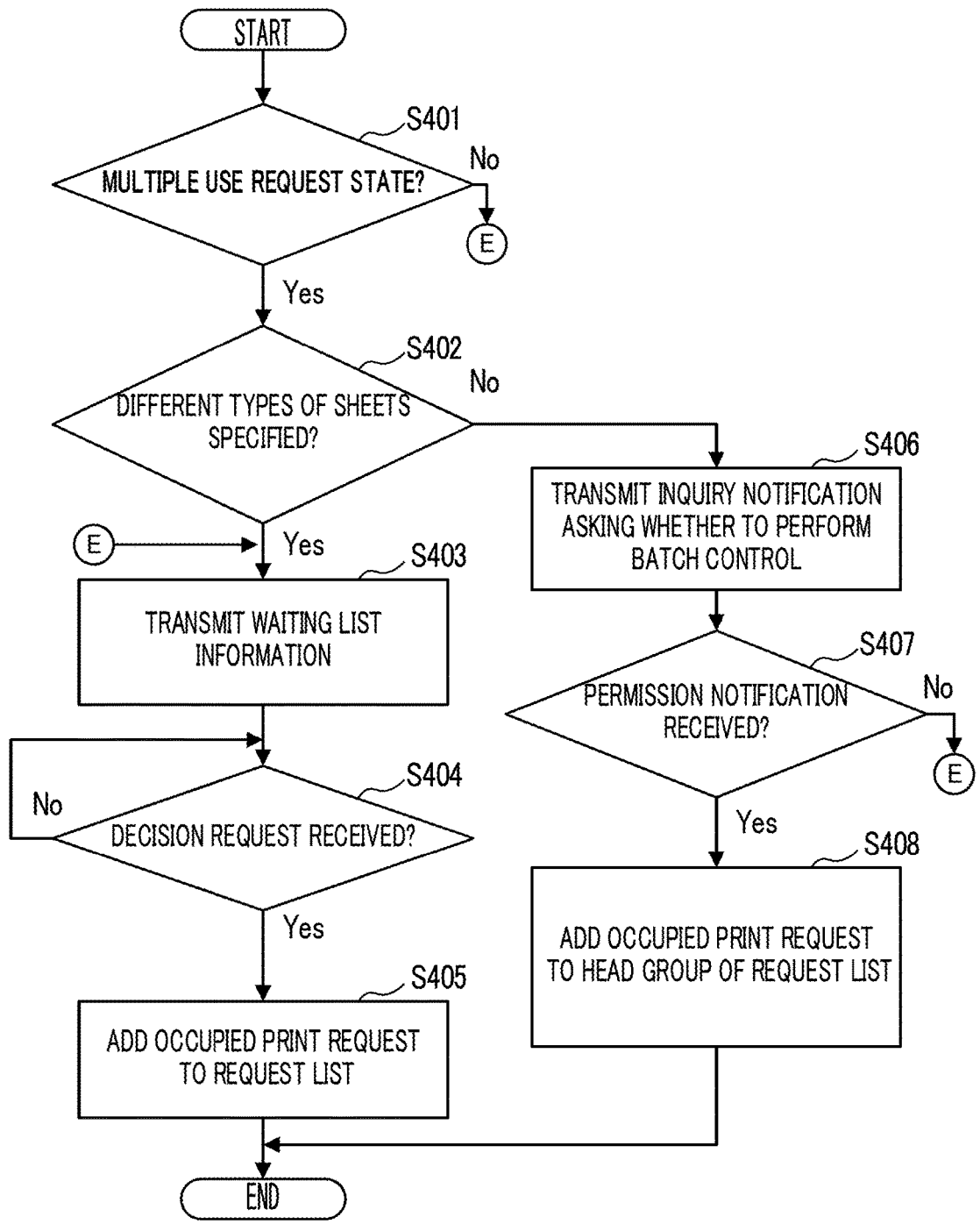
FIG. 7 is a flowchart showing an example of a procedure of a request acceptance process in an image forming apparatus according to a third embodiment.
Figure 8:
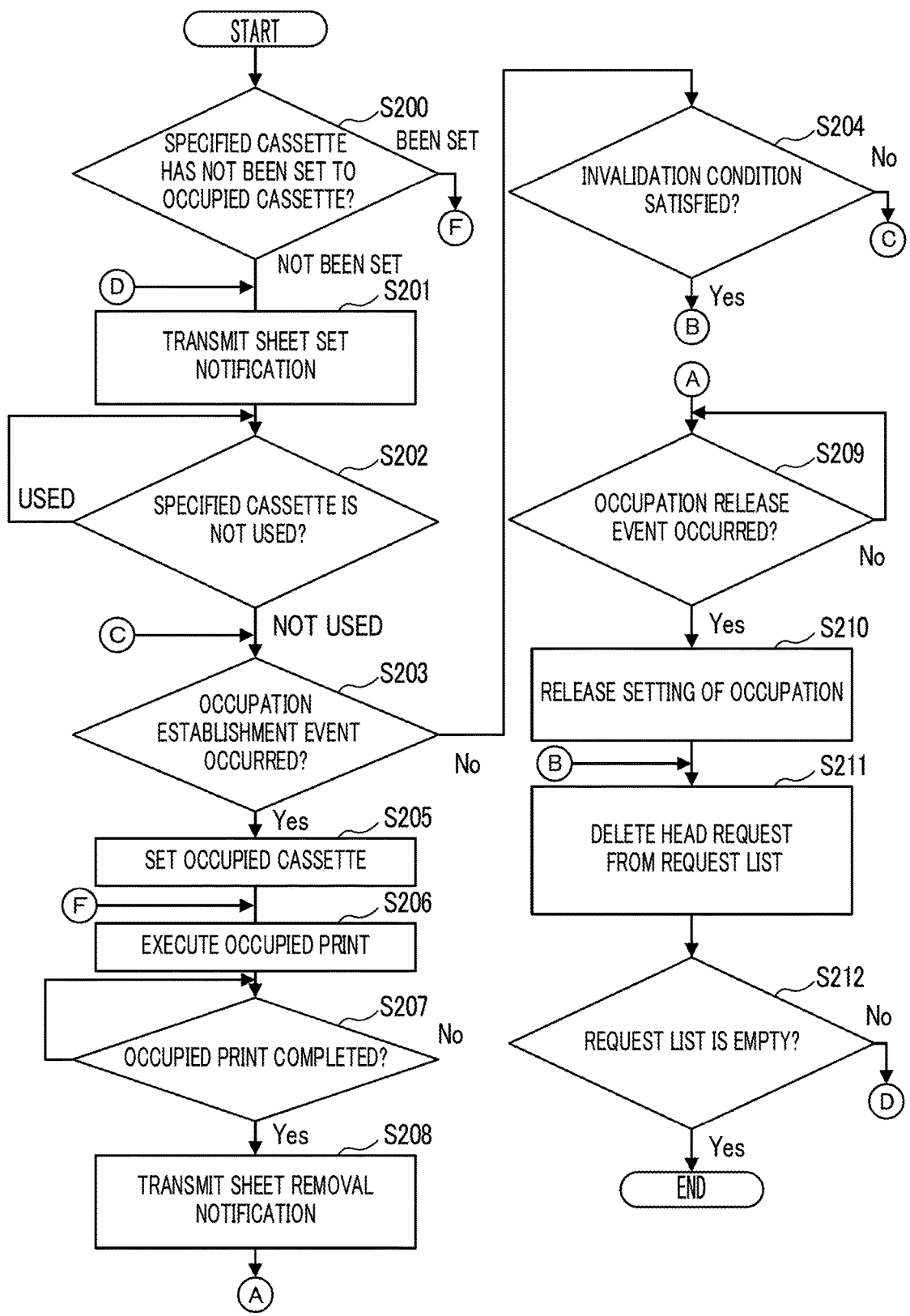
FIG. 8 is a flowchart showing an example of a procedure of an occupation control in the image forming apparatus according to the third embodiment.

Next, a description is given of an example of the procedure of the request acceptance process and the occupation control in an image forming apparatus according to a third embodiment with reference to the flowcharts shown in FIG. 7 and FIG. 8. The request acceptance process and the occupation control in the present embodiment are applicable to the image forming apparatus 10 or the image forming apparatus 10A.

In the present embodiment, the occupation request command Cm0 includes information of the specified cassette and information of the type of the temporary-use sheet 9b. The information of the type of the temporary-use sheet 9b includes at least information of the size of the temporary-use sheet 9b. The information of the type of the temporary-use sheet 9b may further include information of one or more of the color, the thickness, and the material of the temporary-use sheet 9b.

First, differences between the request acceptance process of the present embodiment and the request acceptance process shown in FIG. 2 are described with reference to FIG. 7. In the following description, S401, S402, . . . are identification signs representing a plurality of steps of the request acceptance process of the present embodiment.

<Step S401>

In step S401, as in step S101 shown in FIG. 2, the CPU 81 determines whether or not the multiple use request state has occurred. Upon determining that the multiple use request state has occurred, the CPU 81 moves the process to step S402. Otherwise, the CPU 81 moves the process to step S405.

<Step S402>

In step S402, the CPU 81 determines whether or not a newly received occupation request command Cm0 is a different-type command that specifies a temporary-use sheet 9b of a type that is different from a type of the temporary-use sheet 9b specified by another occupation request command Cm0 that is in the multiple use request state together with the newly received occupation request command Cm0.

Upon determining that the newly received occupation request command Cm0 is the different-type command, the CPU 81 executes the processes of steps S403 to S405. Otherwise, the CPU 81 moves the process to step S406.

In the following description, a plurality of occupation request commands Cm0 that specify a same cassette and a same type of temporary-use sheet 9b in common are referred to as a common request command group. The state where the CPU 81 determines that the newly received occupation request command Cm0 is the different-type command is a state where the CPU 81 has received the common request command group from a plurality of terminal apparatuses.

<Step S403-S405>

The processes of step S403-S405 are the same as the processes of step S102-S104 shown in FIG. 2. The CPU 81 ends the request acceptance process after executing the processes of step S403-S405.

<Step S406>

In step S406, the CPU 81 transmits an inquiry notification asking whether to perform a batch control, to a transmission source of an occupation request command Cm0 received earliest among the occupation request commands Cm0 constituting the common request command group. Thereafter, the CPU 81 moves the process to step S407.

The batch control refers to performing the occupation control on the occupation request commands Cm0 constituting the common request command group in a batch. When the batch control is performed, a plurality of occupied prints corresponding to the occupation request commands Cm0 constituting the common request command group are executed without waiting for a release of the sheet cassette 20 from the setting of the occupied cassette.

The user of the terminal apparatus that has received the inquiry notification performs an operation to input an answer on whether to perform a batch control. The terminal apparatus transmits a permission notification or a non-permission notification to the image forming apparatus 10, in accordance with the input answer.

<Step S407>

In step S407, the CPU 81 monitors whether or not the permission notification is received within a predetermined time period, as an answer to the inquiry notification. In a case where the permission notification is received within the predetermined time period, the CPU 81 moves the process to step S408. Otherwise, the CPU 81 executes the processes of steps S403 to S405.

The common request command group may include two or more occupation request commands Cm0 that have been received prior to a newly received occupation request command Cm0. In this case, the CPU 81 moves the process to step S408 only in a case where it receives the permission notification from all of the transmission sources of the two or more occupation request commands Cm0 that have been received earlier.

<Step S408>

In step S408, the CPU 81 adds a newly received occupied print request Rp0 to the request list L0 as an element of the head group in the request list L0, and stores the request list L0 to which the newly received occupied print request Rp0 has been added, in the secondary storage device 83. Thereafter, the CPU 81 ends the request acceptance process.

[Occupation Control]

Next, a description is given of an example of the procedure of the occupation control performed in the present embodiment, with reference to the flowchart shown in FIG. 8.

In the procedure of the occupation control shown in FIG. 8, step S200 has been added as the initial step in the occupation control shown in FIG. 3. In the occupation control of the present embodiment, the CPU 81 performs the occupation control in a batch on a head request group, namely, occupied print requests Rp0 included in the head group.

<Step S200>

In the occupation control of the present embodiment, the CPU 81 confirms whether the specified cassette corresponding to the head request group in the request list L0 has not been set to the occupied cassette.

Upon confirming that the specified cassette corresponding to the head request group has not been set to the occupied cassette, the CPU 81 executes the processes from the step S201. Otherwise, the CPU 81 executes the process of the step S206 and onward.

As described above, according to the present embodiment, the CPU 81 performs the occupation control on the occupation request commands Cm0 constituting the common request command group in a batch, when it receives the common request command group from a plurality of terminal apparatuses.

According to the present embodiment, the CPU 81 performs the occupation control on the occupation request commands Cm0 constituting the common request command group in a batch, when it receives the permission notification as an answer to the inquiry notification.

With the configuration of the present embodiment, a plurality of occupied prints corresponding to the common request command group are executed efficiently.

[First Application Example]

As a first application example of the image forming apparatus 10, 10A, the CPU 81 may have a function to execute a data registration process of recording sheet size registration data D0 in the secondary storage device 83. The CPU 81 realizes the data registration process by executing a data registration program Pg4 that is stored in the secondary storage device 83 in advance.

As shown in FIG. 9, the sheet size registration data D0 includes a plurality of pieces of cassette identification data D01 that correspond to the plurality of sheet cassettes 20, and a plurality of pieces of size data D02 that respectively correspond to the plurality of pieces of cassette identification data D01. The size data D02 represents a size of sheets 9 set in a corresponding sheet cassette 20.

The sheet size registration data D0 indicates correspondence between one or more sheet cassettes 20 and sizes of sheets 9 set therein. In the example shown in FIG. 9, the sheet size registration data D0 further includes a plurality of pieces of material data D03 that correspond to a plurality of pieces of sheet size registration data D0.

In the data registration process, the CPU 81 sets the sheet size registration data D0 in accordance with operations performed on the operation device 8a, and stores the set sheet size registration data D0 in the secondary storage device 83. It is noted that the secondary storage device 83 in which the sheet size registration data D0 is stored is an example of the second storage device.

In the present application example, the occupation request command Cm0 may specify the specified cassette by specifying the size of the sheet 9. Hereinafter, such an occupation request command Cm0 is referred to as a size-specification-type occupation request command Cm0.

The CPU 81 may receive the size-specification-type occupation request command Cm0. In that case, the CPU 81 automatically selects, as the specified cassette, a sheet cassette 20 corresponding to a sheet size specified by the occupation request command Cm0 in the sheet size registration data D0, from among the plurality of sheet cassettes 20.

In the above-described case, when selecting the specified cassette, the CPU 81 selects, with priority, a sheet cassette 20 other than the occupied cassette, as the specified cassette.

There is a demand for the sizes of the sheets 9 set in some or all of the plurality of sheet cassettes 20 to be avoided as much as possible from being changed. The present application is effective in fulfilling the demand.

[Second Application Example]

As a second application example of the image forming apparatus 10, 10A, the terminal apparatus may transmit the occupation request command Cm0, and after the setting of the occupied cassette is made following occurrence of the occupation establishment event such as a detection of the drawing operation, the terminal apparatus may transmit the print data Pd0 to the image forming apparatus 10.

In the present embodiment, after the specified cassette is set as the occupied cassette, the user performs an operation on the terminal apparatus to transmit the print data Pd0. In this case, before the user performs an operation on the terminal apparatus to transmit the print data Pd0, another user may take out the temporary-use sheets having been set in the occupied cassette or newly set the sheets 9 in the occupied cassette.

In view of the above-described problems, according to the present application example, the CPU 81 executes a predetermined warning notification process when a drawing operation of drawing the occupied cassette is detected again by the drawer sensor 7, during a time period from an occurrence of the occupation establishment event to an execution of the print process using the occupied cassette.

For example, the warning process may include either or both of a process of outputting a warning sound via a buzzer (not shown) and a process of outputting a warning message to the display device 8b.

According to the present application example, it is possible to prevent another user from removing the temporary-use sheet from the occupied cassette, or setting another type of sheet 9 in the occupied cassette.

[Third Application Example]

As a third application example of the image forming apparatus 10, 10A, in the request acceptance process, the CPU 81 may accept the occupied print request Rp0 in accordance with an operation performed on the operation device 8a, not by data reception from the terminal apparatus. In this case, the print data Pd0 corresponding to the occupied print request Rp0 is image data of an image read from the document sheet 90 by the image reading device 1.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
   a print processing device configured to execute a print process to form an image on a sheet;
   one or more sheet supply portions in which sheets to be supplied to the print processing device are set;
   a communication device configured to perform communication with a plurality of information processing apparatuses; and a control device configured to, upon receiving print data from one of the plurality of information processing apparatuses via the communication device, cause the print processing device to execute the print process based on the print data, wherein upon receiving, from one of the plurality of information processing apparatuses as a transmission source, via the communication device, an occupation request command that specifies one of the one or more sheet supply portions as a specified supply portion, the control device performs an occupation control to set the specified supply portion as an occupied supply portion from when a predetermined occupation establishment event occurs to when a predetermined occupation release event occurs, the control device, during the occupation control, permits the occupied supply portion to be used in a print process that is executed based on print data received from the transmission source of the occupation request command, and prohibits other print processes from using the occupied supply portion, and when a multiple use request state occurs by receiving, from one or more other information processing apparatuses among the plurality of information processing apparatuses, a $2^{nd}$ and onward occupation request commands that specify the occupied supply portion as specified supply portions, and after the occupation control ends, the control device executes the occupation control including a predetermined notification process for each of the $2^{nd}$ and onward occupation request commands in an order in which the $2^{nd}$ and onward occupation request commands were received.

2. The image forming apparatus according to claim 1, wherein
the occupation establishment event is a detection of a predetermined occupation establishment operation performed on the image forming apparatus.

3. The image forming apparatus according to claim 2, further comprising:
one or more drawer sensors respectively for the one or more sheet supply portions, wherein each of the one or more drawer sensors detects whether or not a drawing operation of drawing a corresponding sheet supply portion from a main body of the image forming apparatus has been performed, wherein
the occupation establishment event includes a drawing operation of drawing the specified supply portion.

4. The image forming apparatus according to claim 3, wherein
the control device executes a predetermined warning notification process when the drawing operation of drawing the occupied supply portion is detected again by the drawer sensor, during a time period from an occurrence of the occupation establishment event to an execution of the print process using the occupied supply portion.

5. The image forming apparatus according to claim 2, further comprising:
an operation device configured to detect an information input operation, wherein
upon receiving, from one of the information processing devices, an occupied print request that includes an occupation request command and the print data, the control device stores the received occupied print request in a first storage device,
the occupation establishment event includes an operation performed on the operation device to specify the occupied print request stored in the first storage device, and
when the occupation establishment event occurs, the control device causes the print processing device to execute the print process in correspondence with the occupied print request stored in the first storage device.

6. The image forming apparatus according to claim 1, wherein
the occupation release event is a detection of a predetermined occupation release operation performed on the image forming apparatus.

7. The image forming apparatus according to claim 6, further comprising:
one or more drawer sensors respectively for the one or more sheet supply portions that have been attached to the main body of the image forming apparatus in a detachable manner, each of the one or more drawer sensors being configured to detect whether or not a drawing operation of drawing a corresponding sheet supply portion from the main body has been performed, wherein
the occupation release event includes a drawing operation of drawing the specified supply portion.

8. The image forming apparatus according to claim 1, wherein
each of the one or more sheet supply portions includes:
an auxiliary support portion configured such that an auxiliary sheet can be placed thereon so as to be distinguished from main sheets that are the sheets that have been set in the sheet supply portion in advance; and
an auxiliary sheet sensor configured to detect presence or absence of the auxiliary sheet on the auxiliary support portion, wherein
the occupation establishment event includes a detection of the auxiliary sheet in the specified supply portion by the auxiliary sheet sensor, and
the occupation release event includes that the auxiliary sheet has not been detected in the occupied supply portion by the auxiliary sheet sensor.

9. The image forming apparatus according to claim 1, wherein
the occupation request command includes information that specifies a type of the sheets set in the specified supply portion, and
when a common request command group composed of a plurality of occupation request commands that specify a same supply portion and a same type of sheet in common, is received from two or more of the plurality of information processing devices, the control portion is configured to perform the occupation control on the occupation request commands constituting the common request command group in a batch.

10. The image forming apparatus according to claim 9, wherein
the control device transmits an inquiry notification asking whether to perform a batch control, to a transmission source of an occupation request command received earliest among the occupation request commands constituting the common request command group, and upon receiving a permission notification as an answer to the inquiry notification, performs the occupation control on the occupation request commands constituting the common request command group in a batch.

11. The image forming apparatus according to claim 1, wherein the control device records, in a second storage device, sheet size registration data that indicates correspondence between the one or more sheet supply portions and sizes of the sheets set therein, and when the occupation request command specifies the specified supply portion by specifying a size of the sheets, the control device automatically selects, as the specified supply portion, a sheet supply portion that, in the sheet size registration data, corresponds to a sheet size specified by the occupation request command, from among the plurality of sheet supply portion, and when selecting the specified supply portion, the control device selects, with priority, a sheet supply portion other than the occupied supply portion, as the specified supply portion.

12. The image forming apparatus according to claim 1, wherein upon occurrence of the multiple use request state or upon receiving a preliminary inquiry that asks the image forming apparatus whether or not the occupation request command will cause the multiple use request state to occur, the control device transmits waiting list information to each transmission source of the $2^{nd}$ and onward occupation request commands or the preliminary inquiry.

13. The image forming apparatus according to claim 1, wherein the control device invalidates the occupation request command when an invalidation condition is satisfied, the invalidation condition including a condition that a predetermined upper-limit time has elapsed before the occupation establishment event occurs after a reception of the occupation request command.

* * * * *